UNITED STATES PATENT OFFICE.

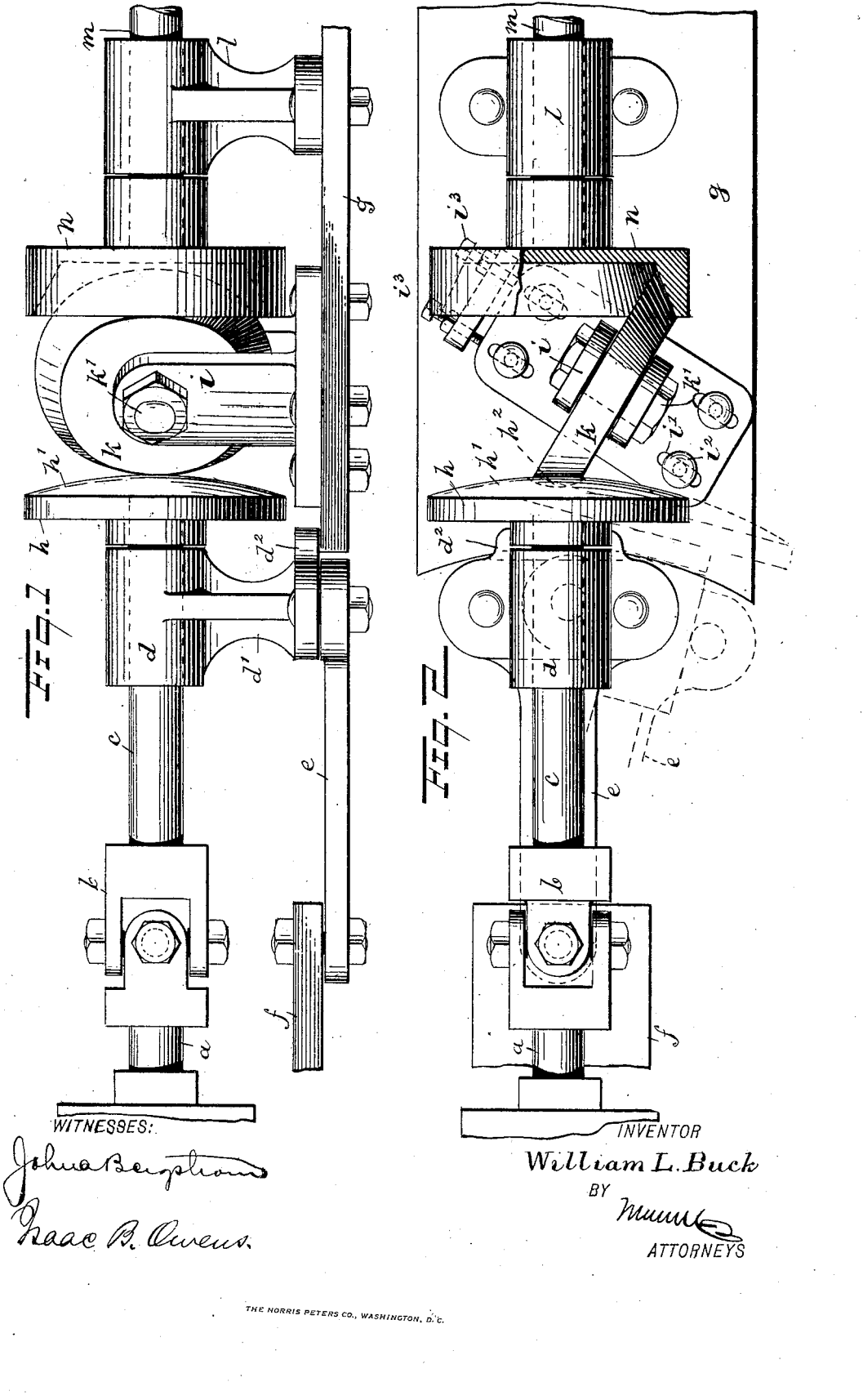

WILLIAM L. BUCK, OF NEW YORK, N. Y.

TRANSMISSION-GEAR.

No. 826,309.   Specification of Letters Patent.   Patented July 17, 1906.

Application filed September 2, 1905. Serial No. 276,802.

*To all whom it may concern:*

Be it known that I, WILLIAM L. BUCK, a citizen of the United States, and a resident of the city of New York, borough of Brooklyn, in the county of Kings and State of New York, have invented a new and Improved Transmission-Gear, of which the following is a full, clear, and exact description.

The invention relates to a mechanism for transmitting rotary motion at different speeds and in opposite directions. It is applicable to various uses, notably in automobile transmission and for transmitting from gasolene motors in marine propulsion.

The invention is of that class in which friction-gears are employed, the change of speed and direction being accomplished by the relative movement of gears, which are meshed the periphery of one gear against the face of the other.

The invention resides in certain special features of construction and relative arrangements of part, which will be fully set forth hereinafter and particularly pointed out in the claims.

Reference is had to the accompanying drawings, which illustrate the preferred form of my invention, and in which—

Figure 1 is a side elevation of the invention, and Fig. 2 is a plan view thereof.

$a$ indicates the drive-shaft, which is connected by a universal joint $b$ with a swing-shaft $c$. Said shaft is carried in a box $d$, which is fastened to the free end of the swing-plate or equivalent member $e$.

$f$ indicates the stationary part on which the member $e$ is mounted so that it may swing, as indicated by the broken lines in Fig. 2. A bracket or pedestal $d'$, supporting the box $d$, has a projecting lug $d^2$, which overhangs the bed-plate $g$, thus assisting to support the outer end of the swing-plate and parts $d$ $d'$ and $c$ in connection therewith. At its free end the swing-shaft $c$ carries a friction-disk $h$, forming one of the transmitting-gears, this disk having a convex face $h'$, in the center of which is formed a cavity $h^2$, the function of which will hereinafter fully appear. The bed-plate $g$ carries a bracket $i$, which supports the axle $k'$ of a bevel friction gear or disk $k$. This disk is arranged diagonally with respect to the normal or middle position of the shaft $c$, and its beveled periphery is adapted to engage the face $h'$ of the gear $h$, as shown. The bracket $i$ has its base formed with slots $i'$, in which bolts $i^2$ operate adjustably to hold the bracket. Said bracket is adjustably held by screws $i^3$, as shown. In this manner the parts may be adjusted to take up wear. The shaft $c$ is free to swing without disturbing the engagement between the parts $h$ and $k$; and it will thus follow that the gear $k$ will be driven from the gear $h$ in one or the other direction, according to which side of the gear $h$ is engaged by the gear $k$. When the parts are in the intermediate position, (shown in Fig. 2,) no movement will be transmitted, and in order to prevent grinding or wearing away the gears when in this position the cavity $h^2$ is formed, this cavity avoiding contact between the two gears when in the position referred to. The bed-plate $g$ also carries a pedestal-bearing $l$, in which a shaft $m$ is revolubly mounted. Said shaft carries an internal bevel friction-gear $n$, which is engaged with the beveled periphery of the gear $k$ at the side opposite that on which the gear $h$ is located. The gears $k$ and $n$ do not change their relative positions, the bearings of both of these gears being rigidly attached to the bed-plate $g$. Motion is therefore transmitted from the gear $h$ to the gear $k$ and from this gear to the gear $n$.

By adjusting the shaft $c$ the shaft $m$ may be driven in either direction and at any speed within the maximum speed, which is determined by the length of the radius of the wheel or gear $h$.

Any suitable means may be connected with the element $e$ and the element $c$ for swinging them. The specific form of these devices depends upon the use to which the transmission-gear is put.

Having thus described the preferred form of my invention, what I claim as new, and desire to secure by Letters Patent, is—

1. In a transmission mechanism, the combination of a laterally-shiftable gear, a second gear having its periphery engaged with the face of the first gear, and an internal bevel-gear engaged with the periphery of the second-named gear.

2. A transmission mechanism having a laterally-shiftable gear or wheel with a convex friction-face, a bevel friction-gear having its periphery engaged with said friction-face, and an internal friction-gear engaged with the periphery of the second or bevel gear.

3. In a transmission mechanism, the combination of a laterally-shiftable gear having a convex friction-face, an intermediate gear having a beveled friction-face engaged with the friction-face of the first gear, the intermediate gear being mounted on a fixed axis, and an internal friction-gear engaged with the intermediate gear.

4. In a transmission mechanism, the combination of a laterally-shiftable gear having a convex friction-face, an intermediate gear having a beveled friction-face engaged with the friction-face of the first gear, the intermediate gear being mounted on a fixed axis, and an internal friction-gear engaged with the intermediate gear, said internal friction-gear having a beveled friction-surface, and the axis of the internal gear ranging diagonally of the axis of the intermediate gear.

5. In a transmission mechanism, the combination of a laterally-shiftable gear, a second gear having its periphery engaged with the face of the first gear, the second gear being beveled, and a bevel-gear engaged with the second-named gear and driven therefrom.

In testimony whereof I have signed my name to this specification in the presence of two subscribing witnesses.

WILLIAM L. BUCK.

Witnesses:
 ISAAC B. OWENS,
 JNO. M. RITTER.